(12) United States Patent
Maruyama (10) Patent No.: US 11,048,039 B2
(45) Date of Patent: Jun. 29, 2021

(54) OPTICAL FIBER

(71) Applicant: Fujikura Ltd., Tokyo (JP)

(72) Inventor: Ryo Maruyama, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 16/956,131

(22) PCT Filed: Feb. 1, 2019

(86) PCT No.: PCT/JP2019/003616
§ 371 (c)(1),
(2) Date: Jun. 19, 2020

(87) PCT Pub. No.: WO2019/159719
PCT Pub. Date: Aug. 22, 2019

(65) Prior Publication Data
US 2020/0326471 A1     Oct. 15, 2020

(30) Foreign Application Priority Data

Feb. 13, 2018 (JP) .............................. JP2018-023228

(51) Int. Cl.
*G02B 6/02* (2006.01)
*G02B 6/028* (2006.01)
*G02B 6/036* (2006.01)

(52) U.S. Cl.
CPC ....... *G02B 6/0281* (2013.01); *G02B 6/02004* (2013.01); *G02B 6/0228* (2013.01); *G02B 6/02266* (2013.01); *G02B 6/03627* (2013.01)

(58) Field of Classification Search
CPC .............. G02B 6/0281; G02B 6/03627; G02B 6/02266; G02B 6/02044; G02B 6/0228; G02B 6/036; G02B 6/028
See application file for complete search history.

(56) References Cited

U.S. PATENT DOCUMENTS 8,135,255 B2    3/2012   Oyamada et al.
8,891,925 B2 *  11/2014  Bickham ............ G02B 6/03627
                                                   385/127

(Continued)

FOREIGN PATENT DOCUMENTS

JP     2014-526066 A     10/2014
JP     2016-518620 A      6/2016

(Continued)

OTHER PUBLICATIONS

International Search Report issued in International Application No. PCT/JP2019/003616, dated Feb. 26, 2019 (5 pages).

*Primary Examiner* — Ryan A Lepisto
(74) *Attorney, Agent, or Firm* — Osha Bergman Watanabe & Burton LLP (57) ABSTRACT

An optical fiber includes: a core; a depressed layer surrounding the core; and a cladding surrounding the depressed layer. A refractive index profile of the core is an α-th power distribution having an index α of 1.0 or more and 2.9 or less. A relative refractive index difference $\Delta^-$ of the depressed layer with respect to the cladding has an absolute value $|\Delta^-|$ that is 0.05% or more and 0.15% or less. A ratio r1/r2 of a radius r1 of the core to an outer radius r2 of the depressed layer is 0.35 or more and 0.60 or less. A cable cutoff wavelength λcc of 22 m is less than 1.26 µm. A mode field diameter at a wavelength of 1.31 inn is larger than 8.6 inn and smaller than 9.5 µm.

8 Claims, 4 Drawing Sheets

(56) References Cited

U.S. PATENT DOCUMENTS

| | | | | |
|---|---|---|---|---|
| 9,020,316 | B2* | 4/2015 | Bookbinder | G02B 6/02019 |
| | | | | 385/124 |
| 9,188,736 | B2* | 11/2015 | Mishra | G02B 6/0281 |
| 9,618,692 | B2* | 4/2017 | Berkey | C03B 37/01453 |
| 9,772,444 | B2* | 9/2017 | Kitamura | G02B 6/03627 |
| 9,798,079 | B2* | 10/2017 | Bookbinder | G02B 6/0281 |
| 9,802,858 | B2* | 10/2017 | Bookbinder | C03B 37/014 |
| 9,989,699 | B2* | 6/2018 | Bennett | G02B 6/02266 |
| 10,067,287 | B2* | 9/2018 | Endo | G02B 6/02009 |
| 10,215,915 | B2* | 2/2019 | Bookbinder | G02B 6/0365 |
| 10,222,545 | B2* | 3/2019 | Yamamoto | G02B 6/03627 |
| 10,422,948 | B2* | 9/2019 | Maruyama | G02B 6/0281 |
| 10,422,949 | B2* | 9/2019 | Maruyama | G02B 6/021 |
| 10,571,628 | B2* | 2/2020 | Bookbinder | G02B 6/03627 |
| 2011/0211796 | A1* | 9/2011 | Bookbinder | G02B 6/03627 |
| | | | | 385/126 |
| 2014/0328566 | A1* | 11/2014 | Bickham | G02B 6/02395 |
| | | | | 385/128 |
| 2017/0075061 | A1 | 3/2017 | Bookbinder et al. | |
| 2017/0176673 | A1* | 6/2017 | Berkey | C03B 19/1453 |
| 2018/0252866 | A1* | 9/2018 | Bookbinder | G02B 6/03627 |

FOREIGN PATENT DOCUMENTS

| | | | |
|---|---|---|---|
| JP | 2018-189914 | A | 11/2018 |
| WO | 2016/047749 | A1 | 3/2016 |
| WO | 2017/048820 | A1 | 3/2017 |

* cited by examiner

OPTICAL FIBER

This is a national stage of International Patent Application No. PCT/JP2019/003616 and claims priority to Japanese Patent Application No. 2018-023228, filed on Feb. 13, 2018, the content of which is incorporated herein by reference.

TECHNICAL FIELD

The present invention relates to an optical fiber.

BACKGROUND

Patent Document 1 discloses an optical fiber having a depressed layer with a smaller refractive index than a clad, the depressed layer positioned between a core and the clad. Patent Document 1 describes the realization of an optical fiber in which the bending loss satisfies the International Telecommunication Union Telecommunication Standardization Sector (ITU-T) recommendation G.657.A1 which is the international standard for an optical fiber while maintaining the mode field diameter and reducing the connection loss with general-purpose optical fibers, by optimizing the relative refractive index difference $\Delta^-$ of the depressed layer with respect to the cladding and the ratio r1/r2 of the radius r1 of the core with respect to the outer radius r2 of the depressed layer.

PATENT LITERATURE

[Patent Document 1] WO2016/047749

However, in an optical fiber, it is required to further reduce the bending loss while keeping the chromatic dispersion value at the zero dispersion wavelength and 1.55 μm (hereinafter referred to as "chromatic dispersion characteristic") within a predetermined range.

SUMMARY

One or more embodiments of the present invention further reduce bending loss in an optical fiber having a depressed layer while keeping chromatic dispersion characteristics within a predetermined range.

An optical fiber according to one or more embodiments of the present invention includes a core; a depressed layer surrounding the core; and a cladding surrounding the depressed layer, wherein a refractive index profile of the core is an α-th power distribution having an index α of 1.0 or more and 2.9 or less, a relative refractive index difference $\Delta^-$ of the depressed layer with respect to the cladding is set such that the absolute value $|\Delta^-|$ is 0.05% or more and 0.15% or less, a ratio r1/r2 of a radius r1 of the core to an outer radius r2 of the depressed layer is set to 0.35 or more and 0.60 or less, a cable cutoff wavelength λcc of 22 m is less than 1.26 μm, and a mode field diameter at a wavelength of 1.31 μm is larger than 8.6 μm and smaller than 9.5 μm.

According to one or more embodiments of the present invention, in an optical fiber having a depressed layer, a bending loss can be further reduced while maintaining the chromatic dispersion characteristics within a predetermined range.

DETAILED DESCRIPTION

Hereinafter, an optical fiber according to one or more embodiments will be described with reference to the drawings. Note that the present invention is not limited to the following embodiments.

Figure 1A:
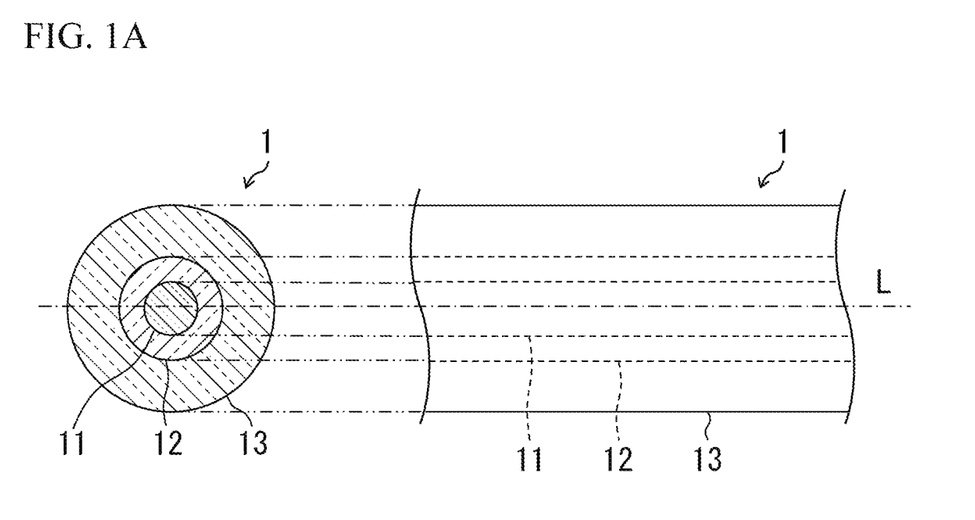
FIG. 1A is a cross-sectional view (left) and a side view (right) showing a structure of an optical fiber according to one or more embodiments.

As shown in FIG. 1A, an optical fiber 1 is a columnar structure mainly composed of silica glass. The optical fiber 1 has a core 11 having a circular cross section, a depressed layer 12 having an annular cross section surrounding the core 11, and a cladding 13 having an annular cross section surrounding the depressed layer 12. The dot-dashed line L shown in FIG. 1A is a central axis of the optical fiber 1 (hereinafter, referred to as a central axis L).

In one or more embodiments, the radius of the core 11 is represented by r1, the outer radius of the depressed layer 12 (radius of the outer peripheral surface) is represented by r2, and the outer radius of the cladding 13 is represented by r3. The inner radius of the depressed layer 12 (the radius of the inner peripheral surface) is r1, and the inner radius of the cladding 13 is r2.

The core 11 is a region having a higher refractive index than the cladding 13 to which an up-dopant such as germanium (an additive for increasing the refractive index) is added. The depressed layer 12 is a region having a lower refractive index than the cladding 13 to which a down-dopant (an additive for lowering the refractive index) such as fluorine is added.

Figure 1B:
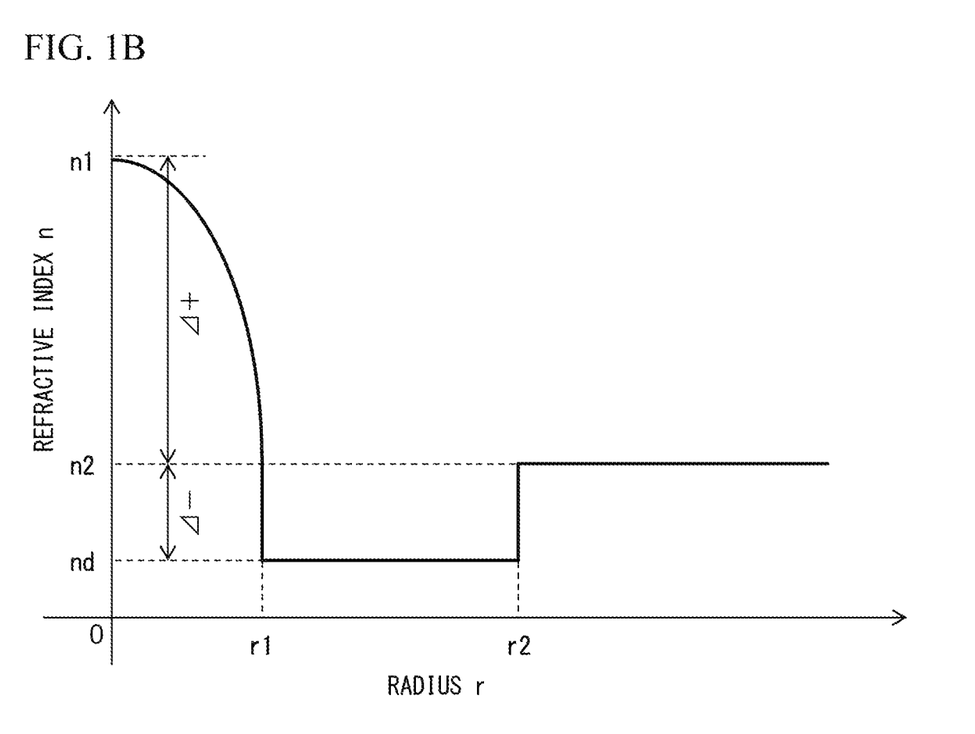
FIG. 1B is a graph showing an example of a refractive index profile of the optical fiber according to one or more embodiments.

FIG. 1B is a graph showing an example of the refractive index profile of the optical fiber 1 shown in FIG. 1A. The horizontal axis in FIG. 1B indicates the distance from the central axis L (hereinafter, referred to as radius r). The vertical axis in FIG. 1B indicates the value of the refractive index n in a portion corresponding to the radius r.

The refractive index of the core 11 is approximated by an α-th power distribution as shown in FIG. 1B. In other words, within the range of $0 \leq r \leq r1$, the refractive index n(r) at the radius r is approximated by $n(r) = n1 [1-2\Delta^+(r/r1)^\alpha]^{1/2}$. Here, n1 is a refractive index (maximum refractive index) on the central axis L, and $\Delta^+$ is a relative refractive index difference of the center of the core 11 with respect to the cladding 13. As α is increased, the α-th power distribution gradually approaches a step-type refractive index profile in which the refractive index is constant.

The refractive index of the depressed layer 12 is approximated by a uniform distribution, as shown in FIG. 1B. In other words, within the range of $r1 \leq r \leq r2$, the refractive index n(r) at the radius r is approximated by n(r)=nd (constant).

Further, the refractive index of the cladding 13 is approximated by a uniform distribution as shown in FIG. 1B. In other words, within the range of $r2 \leq r \leq r3$, the refractive index n(r) at the radius r is approximated by n(r)=n2 (constant).

The relationship nd<n2<n1 is established between the maximum refractive index n1 of the core 11, the refractive index nd of the depressed layer 12, and the refractive index n2 of the cladding 13.

In the following description, the relative refractive index difference $\Delta^+$ of the center of the core 11 with respect to the cladding 13 is used instead of the maximum refractive index n1 of the core 11. Here, the relative refractive index difference $\Delta^+$ is an amount defined by $\Delta^+=(n1^2-n2^2)/(2n1^2)\times 100$ [%]. Further, in the following description, the relative refractive index difference $\Delta^-$ of the depressed layer 12 with respect to the cladding 13 is used, instead of the refractive index nd of the depressed layer 12. Here, the relative refractive index difference $\Delta^-$ is an amount defined by $\Delta^-=(nd^2-n2^2)/(2nd^2)\times 100$ [%].

The refractive index profile of the optical fiber 1 is uniquely determined from the above-described constants $\alpha$, $\Delta^+$, $\Delta^-$, r1, and r2. Hereinafter, these five constants are described as "structural parameters" of the optical fiber 1.

Note that the actual refractive index profile n'(r) of the optical fiber 1 may not coincide with the ideal refractive index profile n(r) shown in FIG. 1B. However, the structural parameters $\alpha$, $\Delta^+$, $\Delta^-$, r1, and r2 can be defined for the actual refractive index profile n'(r) of the optical fiber 1 according to the following procedure (steps 1 to 5). The actual refractive index profile n'(r) of the optical fiber 1 is approximated with high accuracy, by an ideal refractive index profile n(r) determined from the structural parameters $\alpha$, $\Delta^+$, $\Delta^-$, r1, and r2 defined according to the following procedure.

Step 1: In the actual refractive index profile n'(r) of the optical fiber 1, an average value in a range where the refractive index of the cladding 13 is substantially constant is determined, and the average value is set as the refractive index n2 of the cladding 13. As a method of calculating a substantially constant range of n2, for example, an average value of n(r) in r in a range of 5.5 to 6.5 times a value of r0 described later is used.

Step 2: Determine a region of the core approximated by the α-th power distribution. In the actual refractive index profile n'(r), n(r) often changes gradually with respect to r at the boundary between the core and the depressed layer. For example, at this boundary, n(r) may gradually decrease as r increases. This is considered to be due to thermal diffusion of elements such as Ge and F doped in the silica glass in the process of manufacturing a preform (base material) using the VAD method, for example. In such a refractive index profile, when fitting is performed including the boundary between the core and the depressed layer, there is a possibility that approximation is not performed with high accuracy. On the other hand, when fitting is performed for the core region excluding the boundary between the core and the depressed layer boundary, approximation can be made with high accuracy. Specifically, r for obtaining the minimum value of the first order differential dn'(r)/dr of r of n'(r) is obtained, and this is set to r0. Next, within the range of $0 \leq r \leq r0$, the α-th power distribution that best approximates n'(r) (minimizes the square error) is obtained, and the values of n1 and a are determined.

In addition, since the base material is manufactured by using the chemical vapor deposition method (CVD method), even when n(r) is intentionally set such that n(r) gradually changes with respect to r at the boundary between the core and the depressed layer, the configuration of the present application including the above-described fitting method can be applied.

For r1, the minimum r for obtaining n2 (that is, the average value of n(r0×5.5) to n(r0×6.5)) is obtained, and r is set to r1. In r0<r<r1, for example, an actual refractive index profile may be applied, or n(r)=n2 may be defined for that region. Examples of a method of obtaining n2 include a method of using sampling points at predetermined intervals in $r0\times 5.5 \leq r \leq r0 \times 6.5$ and calculating the average value of n'(r) at each sampling point. In this case, the predetermined interval is not particularly limited, and is, for example, 0.5 μm or a value smaller than 0.5 μm.

Step 3: In the actual refractive index profile n'(r) of the optical fiber 1, a minimum value $n_{min}$ of n'(r) is obtained, and an average value $n_{ave}=(n_{min}+n2)/2$ of the minimum value $n_{min}$ and the refractive index n2 is obtained. Then, in the actual refractive index profile n'(r) of the optical fiber 1, the maximum r that satisfies n'(r)=$n_{ave}$ is obtained, and this r is set as the outer radius r2 of the depressed layer 12.

Step 4: The minimum r that satisfies n'(r)=$n_{ave}$ is obtained, and this r is set to r4. In the region r4<r<r2, the average value of the actual refractive index profile n'(r) of the optical fiber 1 is obtained, and this average value is used as the refractive index nd of the depressed layer 12. Examples of a method of calculating the average value include a method of using sampling points at predetermined intervals in r4<r<r2 and calculating the average value of n'(r) at each sampling point. In this case, the predetermined interval is not particularly limited, and is, for example, 0.5 μm or a value smaller than 0.5 μm.

Step 5: From the refractive index n2 of the cladding 13 specified in Step 1 and the maximum refractive index n1 of the core 11 specified in Step 2, the relative refractive index difference $\Delta^+$ of the core 11 with respect to the cladding 13 is determined according to $\Delta^+=(n1^2-n2^2)/(2n1^2)\times 100$ [%]. Further, from the refractive index n2 of the cladding 13 specified in Step 1 and the refractive index nd of the depressed layer 12 specified in Step 4, the relative refractive index difference $\Delta^-$ of the depressed layer 12 with respect to the cladding 13 is determined according to $\Delta^-=(nd^2-n2^2)/(2nd^2)\times 100$ [% a].

Figure 2A:
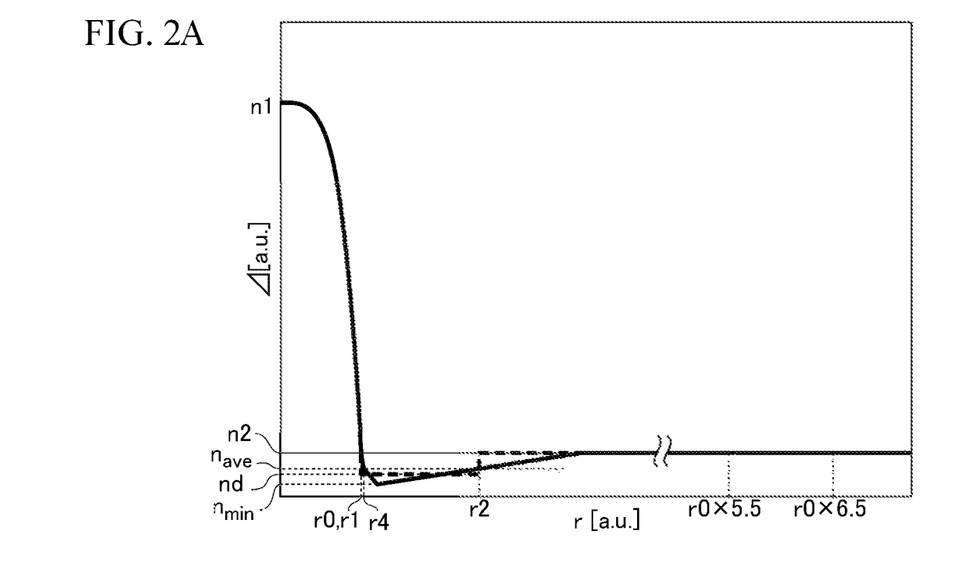
FIGS. 2A and 2B are graphs in which a solid line is a graph showing an ideal refractive index profile determined according to the definition of one or more embodiments, and a broken line is a graph simulating an actual refractive index profile.
Figure 2B:
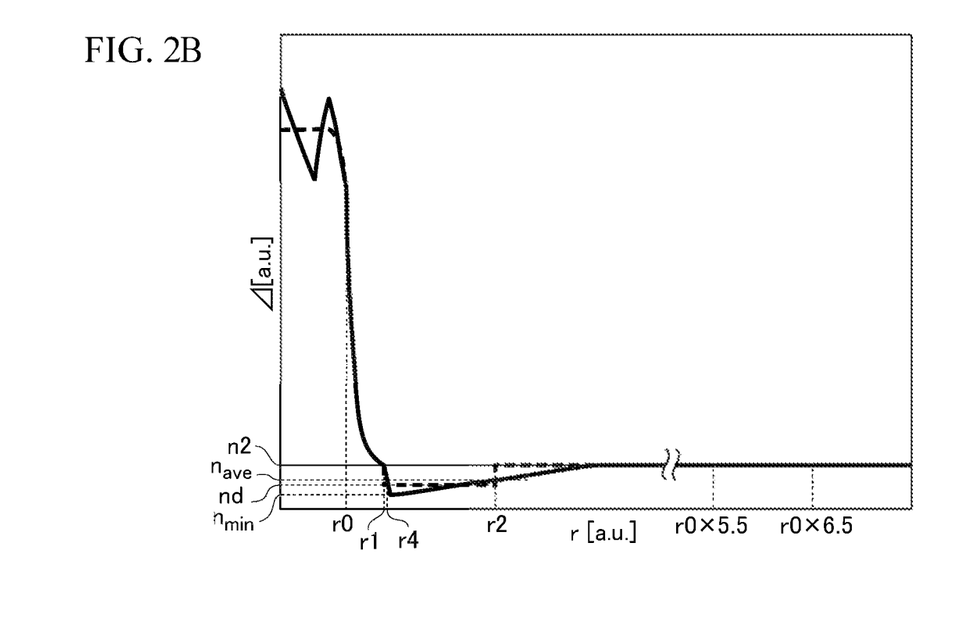

The graphs shown by the solid lines in FIGS. 2A and 2B simulates the actual refractive index profile n'(r). FIG. 2A shows the refractive index profile when r0=r1, and FIG. 2B shows the refractive index profile when r0<r1. In any of the refractive index profiles, when the above procedure is applied to the refractive index profile n'(r), certain structural parameters $\alpha$, $\Delta^+$, $\Delta^-$, r1, and r2 are determined. When the ideal refractive index profile n(r) having the structural parameters $\alpha$, $\Delta^+$, $\Delta^-$, r1, and r2 is plotted, graphs shown by dotted lines in FIGS. 2A and 2B are obtained. According to FIGS. 2A and 2B, it can be confirmed that the actual refractive index profile n'(r) is approximated with high accuracy by the ideal refractive index profile n(r) having the structural parameters $\alpha$, $\Delta^+$, $\Delta^-$, r1, and r2 determined according to the above procedure.

(Optical Fiber Characteristics)

The mode field diameter (MFD) of an optical fiber is defined in IEC60793-1-45. The fiber cutoff wavelength and the cable cutoff wavelength, which are defined as the effective cutoff wavelength of an optical fiber, are defined in IEC60793-1-44. The chromatic dispersion and bending loss of an optical fiber are defined in IEC60793-1-44 and IEC60793-1-47.

The cutoff wavelength indicates a minimum wavelength at which a higher-order mode (in this specification, the LP11 mode) is sufficiently attenuated. Specifically, it is the minimum wavelength at which the loss of the higher-order mode becomes 19.3 dB. The cutoff wavelength includes a fiber cutoff wavelength and a cable cutoff wavelength, and can be measured by, for example, the measurement method described in ITU-T Recommendation G.650.

The zero dispersion wavelength refers to a wavelength at which the value of the chromatic dispersion becomes zero. Here, chromatic dispersion is the sum of material dispersion and waveguide dispersion. Further, the zero dispersion slope indicates a rate of change of chromatic dispersion with respect to a wavelength at a zero dispersion wavelength.

As a result of intensive studies, the inventors of the present application have found that there are the following correlations in various characteristics of an optical fiber.

Figure 3A:
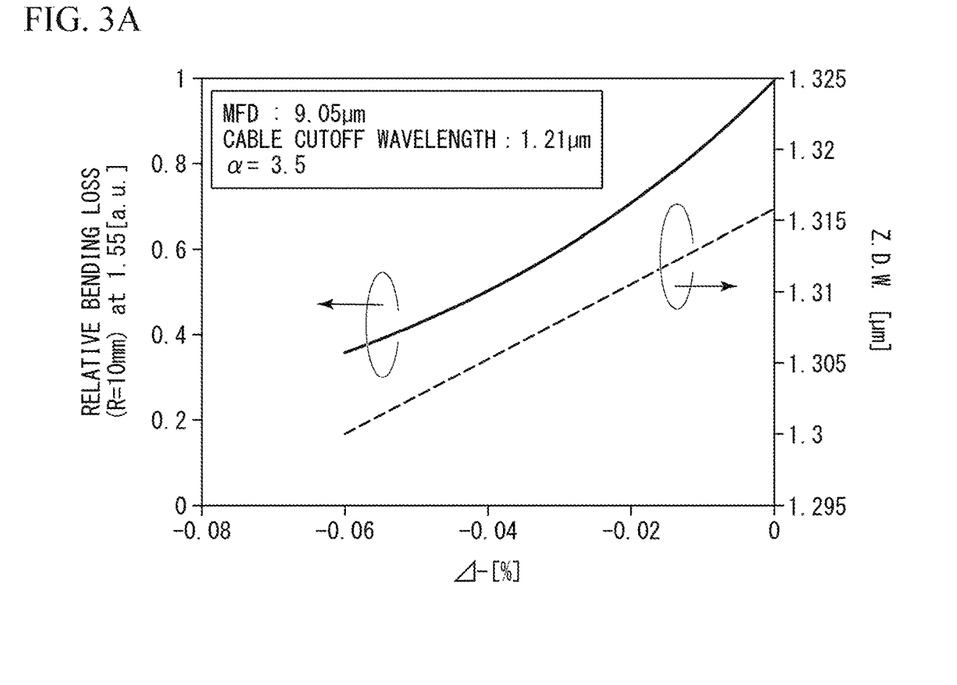
FIG. 3A is a graph showing a relationship between $\Delta^-$, and bending loss and zero dispersion wavelength (ZDW).
Figure 3B:
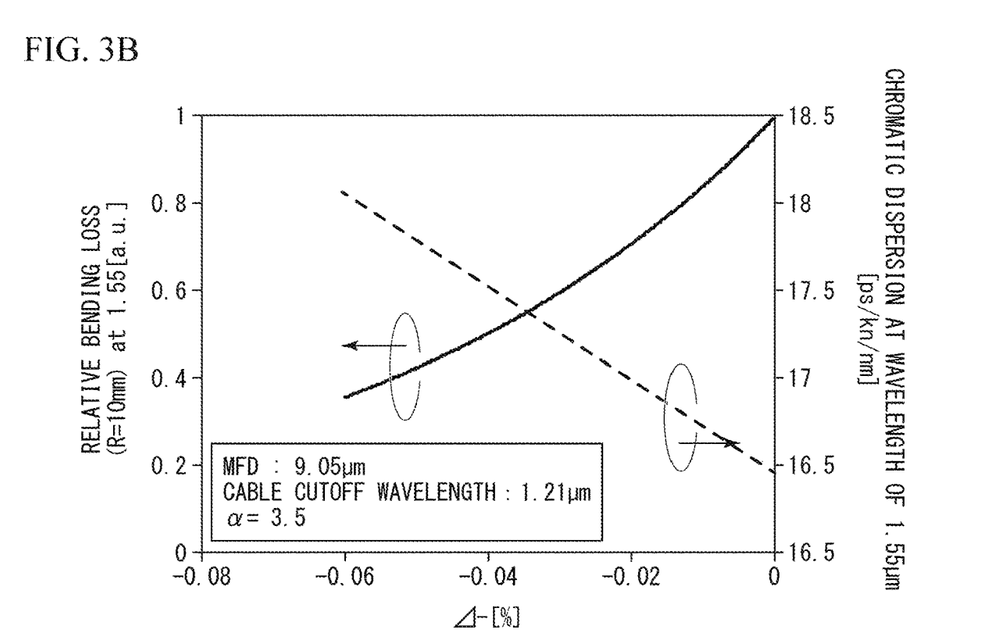
FIG. 3B is a graph showing a relationship between $\Delta^-$, and bending loss and the value of chromatic dispersion at 1.55 μm.

FIG. 3A is a graph showing how zero dispersion wavelength (ZDW) and bending loss change when the value of $\Delta^-$ is changed while the values of MFD, the cable cutoff wavelength, and a are fixed. FIG. 3B is a graph showing how the value of chromatic dispersion and bending loss at a wavelength of 1.55 μm change when the value of $\Delta^-$ is changed while the values of MFD, the cable cutoff wavelength, and a are fixed. In FIGS. 3A and 3B, the MFD is set to 9.05 μm, the cable cutoff wavelength is set to 1.21 μm, and a is set to 3.5. The horizontal axis of FIGS. 3A and 3B indicates the value of the relative refractive index difference $\Delta^-$ described above. In each of FIGS. 3A and 3B, the first vertical axis indicates the relative bending loss at a bending radius R of 10 mm and a wavelength of 1.55 μm. The second vertical axis in FIG. 3A indicates the value of ZDW. The second vertical axis in FIG. 3B indicates the value of chromatic dispersion at a wavelength of 1.55 μm.

As shown in FIG. 3A, the bending loss decreases as the absolute value of $\Delta^-$ increases (toward the left side of the graph). On the other hand, as the absolute value of $\Delta^-$ increases, the value of ZDW decreases. Therefore, when the absolute value of $\Delta^-$ is increased, it is conceivable that the value of ZDW is below the lower limit of 1.300 μm defined in ITU-T Recommendation G.652 or G.657. As shown in FIG. 3B, the bending loss decreases as the absolute value of $\Delta^-$ increases (toward the left side of the graph), but the value of the chromatic dispersion at a wavelength of 1.55 μm increases. Accordingly, when the absolute value of $\Delta^-$ is increased, it is conceivable that both the value of ZDW and the value of the chromatic dispersion at a wavelength of 1.55 μm deviates from the standard range defined in ITU-T Recommendation G.652 or G.657 "ZDW is 1.300 μm or more and the value of the chromatic dispersion at the wavelength of 1.55 μm is 18.6 ps/km/nm or less". That is, the bending loss and the chromatic dispersion characteristic have a so-called trade-off relationship, and when the absolute value of $\Delta^-$ is simply increased to reduce the bending loss, it is understood that a desired chromatic dispersion characteristic may not be obtained in some cases.

Figure 4A:
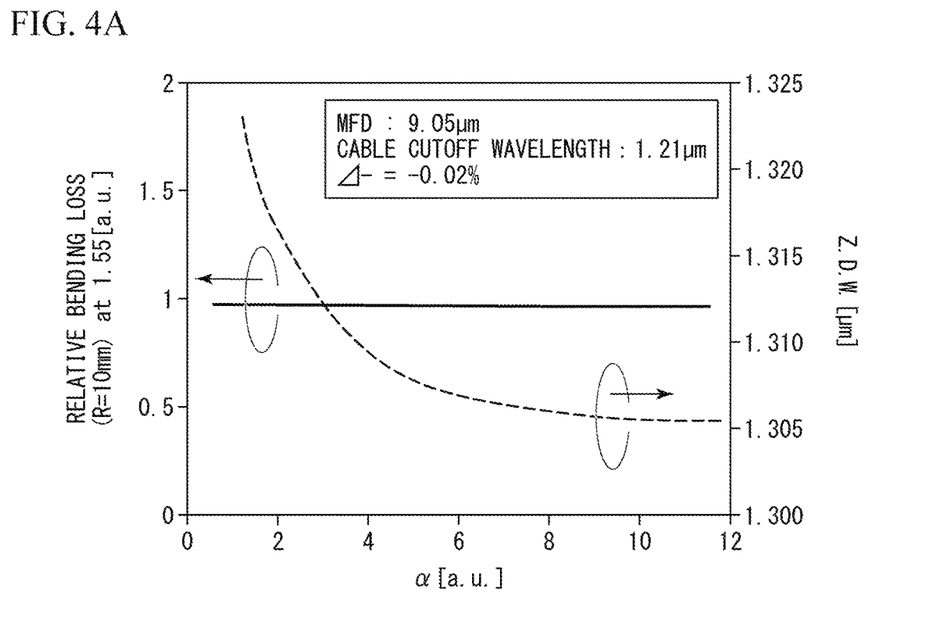
FIG. 4A is a graph showing a relationship between α, and bending loss and zero dispersion wavelength (ZDW).
Figure 4B:
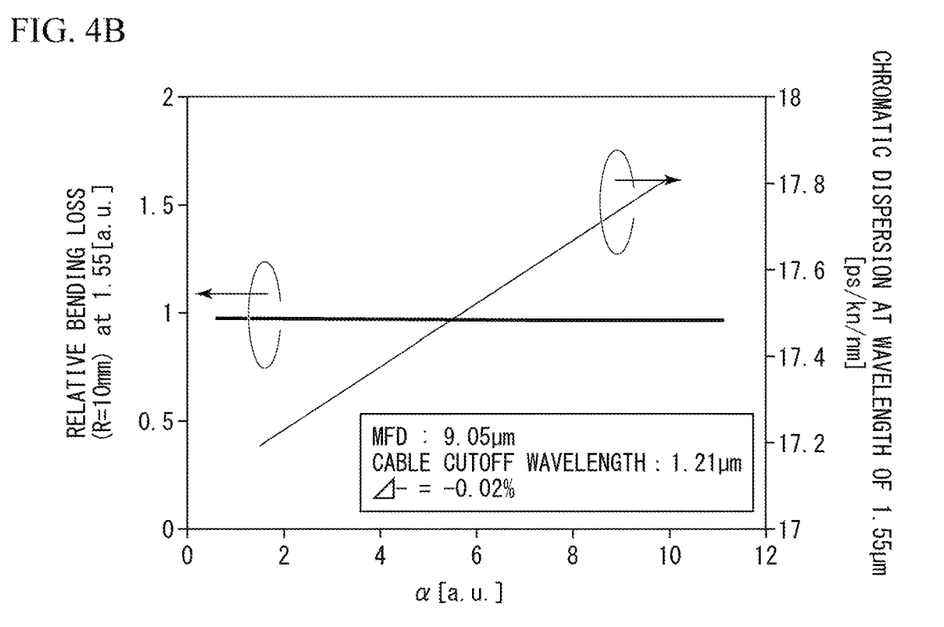
FIG. 4B is a graph showing a relationship between α, and bending loss and the value of chromatic dispersion at 1.55 μm.

FIG. 4A is a graph showing how ZDW and bending loss change when the value of a is changed while the values of MFD, the cable cutoff wavelength, and $\Delta^-$ are fixed. FIG. 4B is a graph showing how the value of chromatic dispersion and bending loss at a wavelength of 1.55 μm change when the value of α is changed while the values of MFD, the cable cutoff wavelength, and $\Delta^-$ are fixed. In FIGS. 4A and 4B, the MFD is set to 9.05 μm, the cable cutoff wavelength is set to 1.21 μm, and $\Delta^-$ is set to 0.02%. The horizontal axes of FIGS. 4A and 4B indicate the value of the index α according to the above-described α-th power distribution (the refractive index profile of the core 11). The first vertical axis and the second vertical axis of FIGS. 4A and 4B are the same as those in FIGS. 3A and 3B.

As shown in FIGS. 4A and 4B, the value of a hardly affects the magnitude of the bending loss. On the other hand, as shown in FIG. 4A, when the value of a is reduced, the value of ZDW can be increased. As shown in FIG. 4B, when the value of a is reduced, the value of the chromatic dispersion at a wavelength of 1.55 μm can be reduced.

To summarize the above considerations for FIGS. 3A, 3B, 4A, and 4B, the bending loss can be reduced by increasing the absolute value of $\Delta^-$. Further, the chromatic dispersion characteristic which is deteriorated as the absolute value of S is increased can be improved to a desired range by decreasing the value of α. That is, by setting both the values of S and a in an appropriate range, it is possible to further reduce the bending loss while maintaining the chromatic dispersion characteristics within the standard.

EXAMPLES

Hereinafter, an appropriate range of the structural parameter will be described using an example.
(Optical Fiber Standards)
First, the standards regarding the various characteristics of the optical fiber will be summarized.
The following Conditions (A) to (C) regarding a bending loss are specified in ITU-T recommendations G.657.A2.
<Condition (A)> When the optical fiber is wound once around a cylindrical mandrel having a radius of 10 mm, the loss increase at a wavelength of 1.55 μm (hereinafter, referred to as $BL_{R=10}$ (1.55 μm)) is 0.1 dB/turn or less, and the loss increase at a wavelength of 1.625 μm (hereinafter, referred to as $BL_{R=10}$ (1.625 μm)) is 0.2 dB/turn or less.
<Condition (B)> When the optical fiber is wound 10 times around a cylindrical mandrel having a radius of 15 mm, the loss increase at a wavelength of 1.55 μm (hereinafter, referred to as $BL_{R=15}$ (1.55 μm)) is 0.03 dB/10 turn or less, and the loss increase at a wavelength of 1.625 μm (hereinafter, referred to as $BL_{R=15}$ (1.625 μm)) is 0.1 dB/10 turn or less.
<Condition (C)> When the optical fiber is wound once around a cylindrical mandrel having a radius of 7.5 mm, the loss increase at a wavelength of 1.55 μm (hereinafter, referred to as $BL_{R=7.5}$ (1.55 μm)) is 0.5 dB/turn or less, and the loss increase at a wavelength of 1.625 μm (hereinafter, referred to as $BL_{R=7.5}$ (1.625 μm)) is 1.0 dB/turn or less.

In one or more embodiments, in order to satisfy the requirements specified in ITU-T recommendations G.652.D or the like, the following Conditions (1) to (5) are satisfied as characteristics of the optical fiber other than the bending loss.
<Condition (1)> The value of MFD at a wavelength of 1.31 μm is larger than 8.6 μm and smaller than 9.5 μm.
<Condition (2)> The value of the zero dispersion wavelength ZDW is 1.305 μm or more and 1.319 μm or less.
<Condition (3)> The value of the zero dispersion slope is 0.073 ps/km/nm² or more and 0.092 ps/km/nm² or less.
<Condition (4)> The value of chromatic dispersion at a wavelength of 1.55 μm is 18.0 ps/km/nm or less.
<Condition (5)> The value of the cable cutoff wavelength λcc of 22 m is smaller than 1.26 μm.

In ITU-T Recommendation G. 652.D, it is recommended that the zero dispersion wavelength ZDW is 1.300 μm or more and 1.324 μm or less, the zero dispersion slope is 0.073 ps/km/nm² or more and 0.092 ps/km/nm² or less, and the value of chromatic dispersion at a wavelength of 1.55 μm is 18.6 ps/km/nm or less. In consideration of manufacturing variations, it is required to design an optical fiber in which the zero dispersion wavelength is 1.305 μm or more and 1.319 μm or less (that is, Condition (2) is satisfied) and the value of chromatic dispersion at a wavelength of 1.55 μm is 18.0 ps/km/nm or less (that is, Condition (4) is satisfied).

Examples 1 to 27

Table 1 below shows Examples 1 to 27 in which the structural parameters are in the range of 1.0≤α≤2.9, 0.35≤r1/r2≤0.60, 0.05%≤|$\Delta^-$|≤0.15%. The values of MAC shown in Tables 1 and 2 below are values obtained by dividing the value of MFD at a wavelength of 1.31 μm by the cable cutoff wavelength λcc.

TABLE 1

| | α [—] | Δ+ [%] | Δ− [%] | r1/r2 [—] | r1 [μm] | r2 [μm] | MFD at 1.31 [μm] | λcc [μm] | MAC [—] | Z.D.W. [μm] | Zero dispersion slope [ps/km/nm²] | Chromatic dispersion (1.55 μm) [ps/km/nm] |
|---|---|---|---|---|---|---|---|---|---|---|---|---|
| Example 1  | 1.0 | 0.500 | −0.15 | 0.50 | 7.25 | 14.50 | 9.11 | 1.238 | 7.36 | 1.313 | 0.092 | 17.92 |
| Example 2  | 1.0 | 0.495 | −0.15 | 0.40 | 6.90 | 17.25 | 8.98 | 1.208 | 7.43 | 1.314 | 0.092 | 17.88 |
| Example 3  | 1.0 | 0.500 | −0.15 | 0.35 | 6.65 | 19.00 | 8.84 | 1.203 | 7.35 | 1.315 | 0.092 | 17.69 |
| Example 4  | 1.0 | 0.515 | −0.13 | 0.50 | 7.00 | 14.00 | 8.95 | 1.211 | 7.39 | 1.317 | 0.092 | 17.62 |
| Example 5  | 1.0 | 0.520 | −0.12 | 0.50 | 7.13 | 14.25 | 8.99 | 1.244 | 7.23 | 1.317 | 0.092 | 17.58 |
| Example 6  | 1.0 | 0.515 | −0.12 | 0.60 | 7.20 | 12.00 | 9.05 | 1.233 | 7.34 | 1.317 | 0.092 | 17.53 |
| Example 7  | 1.2 | 0.470 | −0.12 | 0.50 | 6.88 | 13.75 | 9.07 | 1.206 | 7.52 | 1.312 | 0.092 | 17.85 |
| Example 8  | 1.2 | 0.460 | −0.12 | 0.35 | 6.65 | 19.00 | 9.01 | 1.211 | 7.44 | 1.312 | 0.092 | 17.76 |
| Example 9  | 1.2 | 0.485 | −0.12 | 0.55 | 7.01 | 12.75 | 9.05 | 1.244 | 7.27 | 1.313 | 0.092 | 17.86 |
| Example 10 | 1.2 | 0.485 | −0.12 | 0.40 | 6.80 | 17.00 | 8.65 | 1.247 | 6.94 | 1.317 | 0.090 | 17.79 |
| Example 11 | 1.4 | 0.475 | −0.12 | 0.50 | 6.75 | 13.50 | 8.94 | 1.255 | 7.12 | 1.310 | 0.092 | 17.96 |
| Example 12 | 1.4 | 0.450 | −0.10 | 0.50 | 6.80 | 13.60 | 9.13 | 1.229 | 7.43 | 1.310 | 0.092 | 17.87 |
| Example 13 | 1.6 | 0.440 | −0.12 | 0.55 | 6.74 | 12.25 | 9.11 | 1.242 | 7.33 | 1.306 | 0.092 | 18.00 |
| Example 14 | 1.6 | 0.445 | −0.10 | 0.50 | 6.50 | 13.00 | 9.02 | 1.227 | 7.35 | 1.308 | 0.091 | 17.87 |
| Example 15 | 1.8 | 0.440 | −0.08 | 0.50 | 6.38 | 12.75 | 8.98 | 1.237 | 7.26 | 1.309 | 0.091 | 17.76 |
| Example 16 | 1.8 | 0.460 | −0.09 | 0.50 | 6.13 | 12.25 | 8.71 | 1.211 | 7.19 | 1.311 | 0.091 | 17.52 |
| Example 17 | 1.8 | 0.475 | −0.09 | 0.50 | 6.00 | 12.00 | 8.63 | 1.202 | 7.18 | 1.311 | 0.091 | 17.32 |
| Example 18 | 2.0 | 0.435 | −0.09 | 0.50 | 6.25 | 12.50 | 8.92 | 1.235 | 7.22 | 1.306 | 0.091 | 17.85 |
| Example 19 | 2.2 | 0.440 | −0.08 | 0.50 | 6.08 | 12.15 | 8.82 | 1.211 | 7.28 | 1.306 | 0.091 | 17.77 |
| Example 20 | 2.4 | 0.430 | −0.07 | 0.50 | 5.88 | 11.75 | 8.80 | 1.222 | 7.20 | 1.307 | 0.090 | 17.57 |
| Example 21 | 2.4 | 0.430 | −0.07 | 0.50 | 6.00 | 12.00 | 8.87 | 1.249 | 7.10 | 1.306 | 0.090 | 17.78 |
| Example 22 | 2.6 | 0.410 | −0.06 | 0.40 | 5.80 | 14.50 | 8.90 | 1.208 | 7.37 | 1.307 | 0.090 | 17.56 |
| Example 23 | 2.6 | 0.410 | −0.06 | 0.50 | 6.00 | 12.00 | 9.02 | 1.251 | 7.21 | 1.305 | 0.090 | 17.82 |
| Example 24 | 2.8 | 0.410 | −0.06 | 0.40 | 5.80 | 14.50 | 8.91 | 1.231 | 7.24 | 1.305 | 0.090 | 17.74 |
| Example 25 | 2.8 | 0.405 | −0.05 | 0.40 | 5.90 | 14.75 | 9.03 | 1.252 | 7.21 | 1.305 | 0.090 | 17.78 |
| Example 26 | 2.9 | 0.420 | −0.05 | 0.40 | 5.60 | 14.00 | 8.76 | 1.236 | 7.09 | 1.308 | 0.089 | 17.34 |
| Example 27 | 2.9 | 0.405 | −0.05 | 0.35 | 5.78 | 16.50 | 8.96 | 1.244 | 7.20 | 1.306 | 0.090 | 17.65 |

| | Bending loss at 1.55 μm | | | Bending loss at 1.625 μm | | |
|---|---|---|---|---|---|---|
| | R = 10 mm [dB/turn] | R = 15 mm [dB/turn] | R = 7.5 mm [dB/turn] | R = 10 mm [dB/turn] | R = 15 mm [dB/turn] | R = 7.5 mm [dB/turn] |
| Example 1  | 0.006 | 0.005 | 0.058 | 0.009 | 0.019 | 0.204 |
| Example 2  | 0.004 | 0.008 | 0.305 | 0.005 | 0.066 | 0.065 |
| Example 3  | 0.003 | 0.014 | 0.277 | 0.003 | 0.084 | 0.547 |
| Example 4  | 0.015 | 0.005 | 0.195 | 0.029 | 0.020 | 0.500 |
| Example 5  | 0.011 | 0.005 | 0.136 | 0.025 | 0.016 | 0.431 |
| Example 6  | 0.006 | 0.005 | 0.367 | 0.021 | 0.015 | 0.872 |
| Example 7  | 0.034 | 0.006 | 0.414 | 0.076 | 0.029 | 0.822 |
| Example 8  | 0.004 | 0.011 | 0.303 | 0.005 | 0.094 | 0.051 |
| Example 9  | 0.013 | 0.005 | 0.289 | 0.046 | 0.016 | 0.727 |
| Example 10 | 0.004 | 0.004 | 0.284 | 0.006 | 0.015 | 0.580 |
| Example 11 | 0.003 | 0.004 | 0.094 | 0.006 | 0.014 | 0.375 |
| Example 12 | 0.054 | 0.006 | 0.425 | 0.131 | 0.021 | 0.914 |
| Example 13 | 0.019 | 0.005 | 0.455 | 0.073 | 0.016 | 0.957 |
| Example 14 | 0.029 | 0.005 | 0.345 | 0.096 | 0.017 | 0.826 |
| Example 15 | 0.015 | 0.005 | 0.424 | 0.078 | 0.016 | 0.995 |
| Example 16 | 0.005 | 0.005 | 0.430 | 0.021 | 0.015 | 0.932 |
| Example 17 | 0.003 | 0.005 | 0.396 | 0.006 | 0.015 | 0.863 |
| Example 18 | 0.006 | 0.005 | 0.439 | 0.022 | 0.015 | 0.520 |
| Example 19 | 0.006 | 0.005 | 0.477 | 0.030 | 0.016 | 0.525 |
| Example 20 | 0.007 | 0.005 | 0.259 | 0.038 | 0.016 | 1.137 |
| Example 21 | 0.003 | 0.005 | 0.465 | 0.006 | 0.015 | 1.016 |
| Example 22 | 0.056 | 0.005 | 0.507 | 0.191 | 0.019 | 1.066 |
| Example 23 | 0.016 | 0.005 | 0.629 | 0.125 | 0.017 | 1.363 |
| Example 24 | 0.011 | 0.005 | 0.448 | 0.052 | 0.016 | 1.040 |
| Example 25 | 0.012 | 0.005 | 0.507 | 0.063 | 0.016 | 1.077 |
| Example 26 | 0.008 | 0.005 | 0.482 | 0.042 | 0.016 | 1.045 |
| Example 27 | 0.013 | 0.005 | 0.425 | 0.049 | 0.016 | 1.010 |

In Examples 1 to 27 shown in Table 1, the values of $BL_{R=10}$ (1.55 μm) are 0.002 to 0.056 dB/turn, which are less than 0.1 dB/turn, and have a margin of at least 0.044 dB/turn with respect to the upper limit value. Further, the values of $BL_{R=10}$ (1.625 μm) are 0.004 to 0.191 dB/turn, which are less than 0.2 dB/turn, and have a margin of at least 0.009 dB/turn with respect to the upper limit value. Thus, Examples 1 to 27 satisfy Condition (A).

In Examples 1 to 27 shown in Table 1, the values of $BL_{R=15}$ (1.55 μm) are 0.004 to 0.014 dB/10 turn, which are less than 0.03 dB/10 turn, and have a margin of at least 0.016 dB/10 turn with respect to the upper limit value. Further, the values of $BL_{R=15}$ (1.625 μm) are 0.014 to 0.054 dB/10 turn, which are less than 0.1 dB/10 turn, and have a margin of at least 0.046 dB/10 turn with respect to the upper limit value. Thus, Examples 1 to 27 satisfy Condition (B).

As described above, Examples 1 to 27 satisfy the Conditions (A) and (B) regarding bending. This is because the bending loss is reduced by increasing the value of |Δ⁻| compared to the related art (see FIGS. 3A and 3B).

Further, since the values of MFD at a wavelength of 1.31 μm are 8.63 to 9.13 μm, Examples 1 to 27 satisfy Condition (1), and there is a margin of 0.03 μm with respect to the lower limit and a margin of 0.37 μm with respect to the upper limit value. Further, since the values of zero dispersion wavelength (ZDW) are 1.305 to 1.317 μm, Condition (2) is satisfied, and there is a margin of 0.002 μm with respect to the upper limit value. Further, since the values of the zero dispersion slope are 0.089 to 0.092 ps/km/nm², Condition (3) is satisfied, and there is a margin of 0.016 ps/km/nm² with respect to the lower limit. Further, since the values of the chromatic dispersion at a wavelength of 1.55 μm are 17.32 to 18.00 ps/km/nm, Condition (4) is satisfied. Further, since the values of λcc (cable cutoff wavelength) are 1.202 to 1.255 μm, Condition (5) is satisfied.

From the above results, by setting the structural parameters within the range of $1.0 \leq \alpha \leq 2.9$, $0.35 \leq r1/r2 \leq 0.60$, $0.05\% \leq |\Delta^-| \leq 0.15\%$, it is possible to obtain the optical fiber 1 satisfying Conditions (A) and (B) by reducing the bending loss while satisfying Conditions (1) to (5) other than the bending loss.

Comparative Examples 1-4

Next, Comparative Examples 1 to 4 will be described with reference to Table 2. Comparative Examples 1 and 2 satisfy $1.0 \leq \alpha \leq 2.9$ but do not satisfy $0.05\% \leq |\Delta^-| \leq 0.15\%$. Comparative Examples 3 and 4 satisfy $0.05\% \leq |\Delta^-| \leq 0.15\%$, but do not satisfy $1.0 \leq \alpha \leq 2.9$.

tions (1) to (4), it is understood that it is necessary to satisfy $0.05\% \leq |\Delta^-| \leq 0.15\%$ and $\alpha \leq 2.9$.

In one or more embodiments, the value of α may be 1.0 or more. The reason is described below. A chemical vapor deposition method (CVD method) is generally known as a method for manufacturing a core region in which α is controlled, but by the CVD method, a so-called central dip may be formed. The central dip refers to a portion where the refractive index has decreased at the center of the core. In order to reduce the influence of the central dip while further reducing the bending loss and maintaining the value of zero dispersion wavelength (ZDW) in the above-described Condition (2), the value of α may be 1.0 or more. When the value of α is less than 1.0, the refractive index sharply increases toward the center of the core, so that it is easily affected by the central dip. Therefore, it is not easy to actually manufacture an optical fiber having a value of α less than 1.0.

Taking the above into consideration, one or more embodiments may satisfy $0.05\% \leq |\Delta^-| \leq 0.15\%$ and $1.0 \leq \alpha \leq 2.9$. Thereby, it is possible to provide an optical fiber that satisfies the various characteristics specified in, for example, ITU-T Recommendation G.652.D and has a lower bending loss than before. More specifically, the bending loss can be reduced by increasing the value of $|\Delta^-|$. Then, the zero dispersion wavelength and the chromatic dispersion values

TABLE 2

|  | α [—] | Δ+ [%] | Δ- [%] | r1/r2 [—] | r1 [μm] | r2 [μm] | MFD at 1.31 [μm] | λcc [μm] | MAC [—] | Z.D.W. [μm] | Zero dispersion slope [ps/km/nm²] | Chromatic dispersion (1.55 μm) [ps/km/nm] |
|---|---|---|---|---|---|---|---|---|---|---|---|---|
| Comparative Example 1 | 2.5 | 0.390 | −0.03 | 0.30 | 5.85 | 19.50 | 9.16 | 1.203 | 7.61 | 1.311 | 0.088 | 17.11 |
| Comparative Example 2 | 1.0 | 0.490 | −0.16 | 0.45 | 7.09 | 15.75 | 9.08 | 1.213 | 7.49 | 1.312 | 0.093 | 18.10 |
| Comparative Example 3 | 3.0 | 0.395 | −0.05 | 0.40 | 5.90 | 14.75 | 9.11 | 1.255 | 7.26 | 1.303 | 0.090 | 17.91 |
| Comparative Example 4 | 3.0 | 0.415 | −0.15 | 0.35 | 5.78 | 16.50 | 8.66 | 1.257 | 6.89 | 1.294 | 0.093 | 18.87 |

|  | Bending loss at 1.55 μm | | | Bending loss at 1.625 μm | | |
|---|---|---|---|---|---|---|
|  | R = 10 mm [dB/turn] | R = 15 mm [dB/turn] | R = 7.5 mm [—] | R = 10 mm [%] | R = 15 mm [%] | R = 7.5 mm [—] |
| Comparative Example 1 | 0.031 | 0.250 | — | 0.184 | 0.780 | — |
| Comparative Example 2 | 0.006 | 0.008 | 0.346 | 0.049 | 0.008 | 0.663 |
| Comparative Example 3 | 0.002 | 0.005 | 0.530 | 0.126 | 0.017 | 1.120 |
| Comparative Example 4 | 0.002 | 0.004 | 0.257 | 0.002 | 0.013 | 0.527 |

As shown in Table 2, in Comparative Example 1, the value of $BL_{R=15}$ (1.55 μm) exceeds 0.03 dB/10 turn, the value of $BL_{R=15}$ (1.625 μm) exceeds 0.1 dB/10 turn, and Condition (B) is not satisfied. Comparative Example 3 satisfies Condition (A), but does not satisfy Condition (2) because the value of the zero dispersion wavelength ZDW is less than 1.305 μm. Comparative Examples 2 and 4 satisfy Condition (A), but do not satisfy Condition (3) because the value of the zero dispersion slope exceeds 0.092 ps/km/nm². Comparative Examples 2 and 4 do not satisfy Condition (4) because the value of chromatic dispersion at a wavelength of 1.55 μm exceeds 18.0 ps/km/nm. From the comparison between Examples 1 to 27 and Comparative Examples 1 to 4, in order to satisfy Condition (A) while satisfying Condiat the wavelength of 1.55 μm, which deteriorate as the value of $|\Delta^-|$ is increased, can be set to be within a predetermined range by decreasing the value of the index α.

Incidentally, in Examples 1 to 19 in Table 1, the values of $BL_{R=7.5}$ (1.55 μm) are 0.058 to 0.477 dB/turn, which are less than 0.5 dB/turn, and have a margin of at least 0.023 dB/turn with respect to the upper limit value. Further, in Examples 1 to 19, the values of $BL_{R=7.5}$ (1.625 μm) are 0.051 to 0.995 dB/turn, which are less than 1.0 dB/turn, and have a margin of at least 0.005 dB/turn with respect to the upper limit value. Therefore, Examples 1 to 19 satisfy Condition (C).

On the other hand, Examples 20 to 27 do not satisfy Condition (C) because the value of $BL_{R=7.5}$ (1.625 μm) exceeded 1.0 dB/turn.

Here, the structural parameters of Examples 1 to 19 and Examples 20 to 27 will be compared. In Examples 1 to 19, the structural parameters are in the range of $1.0 \leq \alpha \leq 2.2$, $0.35 \leq r1/r2 \leq 0.60$, $0.08\% \leq |\Delta^-| \leq 0.15\%$. On the other hand, in Examples 20 to 27, the value of $\alpha$ is 2.4 or more, and the value of $|\Delta^-|$ is 0.07% or less.

From the above results, by setting the structural parameters in the range of $1.0 \leq \alpha \leq 2.2$, $0.35 \leq r1/r2 \leq 0.60$, $0.08\% \leq |\Delta^-| \leq 0.15\%$, it is possible to obtain the optical fiber 1 satisfying Conditions (A) to (C) by reducing the bending loss while satisfying Conditions (1) to (4) other than the bending loss. Further, since all of Conditions (A) to (C) are satisfied, it is possible to provide an optical fiber 1 that satisfies the requirements for bending loss specified in ITU-T Recommendation G.657.A2.

When the value of r1/r2 is significantly small, the mode field diameter becomes small, and as a result, the connection loss when connected to another optical fiber may exceed the upper limit value of the allowable range. When r1/r2 is set to 0.40 or more, exceeding the upper limit value hardly occurs. In consideration of this point, the value of r1/r2 may be 0.40 or more and 0.60 or less in one or more embodiments.

On the other hand, when r1/r2 is significantly large, the bending loss may exceed the upper limit value of the allowable range. When r1/r2 is set to 0.55 or less, exceeding the upper limit value hardly occurs. In consideration of this point, the value of r1/r2 may be 0.40 or more and 0.55 or less in one or more embodiments.

In Examples 1 to 27, the loss increase at a wavelength of 1.55 μm when the optical fiber is wound 10 times around a cylindrical mandrel with a radius of 15 mm is less than 0.03 dB, the loss increase at a wavelength of 1.625 μm when the optical fiber is wound 10 times around a cylindrical mandrel with a radius of 15 mm is less than 0.1 dB, the loss increase at a wavelength of 1.55 μm when the optical fiber is wound once around a cylindrical mandrel with a radius of 10 mm is less than 0.1 dB, and the loss increase at a wavelength of 1.625 μm when the optical fiber is wound once around a cylindrical mandrel with a radius of 10 mm is less than 0.2 dB. Thus, according to one or more embodiments, it is possible to provide an optical fiber in which the bending loss at the bending radii of 15 mm and 10 mm specified in ITU-T recommendations G.657.A2 is within a predetermined range.

In Examples 1 to 19, the loss increase at a wavelength of 1.55 μm when the optical fiber is wound 10 times around a cylindrical mandrel with a radius of 15 mm is less than 0.03 dB, the loss increase at a wavelength of 1.625 μm when the optical fiber is wound 10 times around a cylindrical mandrel with a radius of 15 mm is less than 0.1 dB, the loss increase at a wavelength of 1.55 μm when the optical fiber is wound once around a cylindrical mandrel with a radius of 10 mm is less than 0.1 dB, the loss increase at a wavelength of 1.625 μm when the optical fiber is wound once around a cylindrical mandrel with a radius of 10 mm is less than 0.2 dB, the loss increase at a wavelength of 1.55 μm when the optical fiber is wound once around a cylindrical mandrel with a radius of 7.5 mm is less than 0.5 dB, and the loss increase at a wavelength of 1.625 μm when the optical fiber is wound once around a cylindrical mandrel with a radius of 7.5 mm is less than 1.0 dB. Thus, according to one or more embodiments, it is possible to provide an optical fiber in which the bending loss at the bending radii of 15 mm, 10 mm, and 7.5 mm specified in ITU-T recommendations G.657.A2 is within a predetermined range.

By setting the mode field diameter (MFD) at a wavelength of 1.31 μm to be larger than 8.6 μm and smaller than 9.5 μm, one of the requirements specified in ITU-T Recommendation G.652 or the like can be satisfied. In consideration of manufacturing variations or the like, the value of MFD may be 8.8 μm or more and 9.2 μm or less in one or more embodiments.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims Further, it is possible to appropriately replace the components in the above-described embodiments or examples with known components without departing from the spirit of the present invention.

REFERENCE SIGNS LIST

1 Optical fiber
11 Core
12 Depressed layer
13 Cladding

What is claimed is:
1. An optical fiber comprising:
a core;
a depressed layer surrounding the core; and
a cladding surrounding the depressed layer,
wherein a refractive index profile of the core is an α-th power distribution having an index α of 1.0 or more and 2.9 or less,
wherein a relative refractive index difference $\Delta^-$ of the depressed layer with respect to the cladding has an absolute value $|\Delta^-|$ that is 0.05% or more and 0.15% or less,
wherein a ratio r1/r2 of a radius r1 of the core to an outer radius r2 of the depressed layer is 0.35 or more and 0.60 or less,
wherein a cable cutoff wavelength λcc of 22 m is less than 1.26 μm,
wherein a mode field diameter at a wavelength of 1.31 μm is larger than 8.6 μm and smaller than 9.5 μm and
wherein the index α is obtained by calculating the α-th power distribution that minimizes a square error of an actual refractive index profile n'(r) of the optical fiber in a range of $0 \leq r \leq r0$,
where r is a distance from a central axis of the optical fiber, and r0 is a radius of the optical fiber for obtaining a minimum value of a first order differential dn'(r)/dr of n'(r).
2. The optical fiber according to claim 1,
wherein the ratio r1/r2 is 0.40 or more and 0.60 or less.
3. The optical fiber according to claim 1,
wherein a loss increase at a wavelength of 1.55 μm is less than 0.03 dB when the optical fiber is wound 10 times around a cylindrical mandrel with a radius of 15 mm,
wherein a loss increase at a wavelength of 1.625 μm is less than 0.1 dB when the optical fiber is wound 10 times around a cylindrical mandrel with a radius of 15 mm,
wherein a loss increase at a wavelength of 1.55 μm is less than 0.1 dB when the optical fiber is wound once around a cylindrical mandrel with a radius of 10 mm, and wherein a loss increase at a wavelength of 1.625 μm is less than 0.2 dB when the optical fiber is wound once around a cylindrical mandrel with a radius of 10 mm.

4. The optical fiber according to claim 1,
wherein any one condition is satisfied from the group consisting of:
a value of a zero dispersion wavelength ZDW is 1.305 μm or more and 1.319 μm or less;
a value of a zero dispersion slope is 0.092 ps/km/nm$^2$ or less; and
a value of chromatic dispersion at a wavelength of 1.55 μm is 18.00 ps/km/nm or less.

5. The optical fiber according to claim 1,
wherein the index α is 1.0 or more and 2.2 or less, and the absolute value |Δ$^-$| is 0.08% or more and 0.15% or less.

6. The optical fiber according to claim 5,
wherein a loss increase at a wavelength of 1.55 μm is less than 0.03 dB when the optical fiber is wound 10 times around a cylindrical mandrel with a radius of 15 mm,
wherein a loss increase at a wavelength of 1.625 μm is less than 0.1 dB when the optical fiber is wound 10 times around a cylindrical mandrel with a radius of 15 mm,
wherein a loss increase at a wavelength of 1.55 μm is less than 0.1 dB when the optical fiber is wound once around a cylindrical mandrel with a radius of 10 mm,
wherein the loss increase at a wavelength of 1.625 μm is less than 0.2 dB when the optical fiber is wound once around a cylindrical mandrel with a radius of 10 mm,
wherein the loss increase at a wavelength of 1.55 μm is less than 0.5 dB when the optical fiber is wound once around a cylindrical mandrel with a radius of 7.5 mm, and
wherein the loss increase at a wavelength of 1.625 μm is less than 1.0 dB when the optical fiber is wound once around a cylindrical mandrel with a radius of 7.5 mm.

7. The optical fiber according to claim 1,
wherein the ratio r1/r2 is 0.40 or more and 0.55 or less.

8. The optical fiber according to claim 1,
wherein the mode field diameter at a wavelength of 1.31 μm is 8.8 μm or more and 9.2 μm or less.

* * * * *